US00RE35981E

United States Patent [19]

Nagy et al.

[11] E Patent Number: Re. 35,981

[45] Reissued Date of Patent: Dec. 8, 1998

[54] SYSTEM FOR CLEANING MOLDING EQUIPMENT USING A LASER

[75] Inventors: Robert E. Nagy; Timothy F. Shelton, both of Xenia; Jeffrey L. Milam, Beavercreek, all of Ohio

[73] Assignee: Vernay Laboratories, Inc., Yellow Springs, Ohio

[21] Appl. No.: 770,295

[22] Filed: Dec. 20, 1996

Related U.S. Patent Documents

Reissue of:

[64] Patent No.: 5,373,140
Issued: Dec. 13, 1994
Appl. No.: 33,280
Filed: Mar. 16, 1993

[51] Int. Cl.[6] ..... B23K 26/00

[52] U.S. Cl. ..... 219/121.68

[58] Field of Search ..... 219/121.68, 121.69, 219/121.65, 121.66, 121.85, 121.6, 121.77; 134/1

[56] References Cited

U.S. PATENT DOCUMENTS

| | | | |
|---|---|---|---|
| Re. 33,777 | 12/1991 | Woodroffe | 134/1 |
| 3,091,557 | 5/1963 | Heijmans et al. | 134/1 |
| 4,025,790 | 5/1977 | Jetter et al. | 250/284 |
| 4,125,757 | 11/1978 | Ross | 219/112.6 |
| 4,272,681 | 6/1981 | Fill et al. | 250/423 P |
| 4,368,080 | 1/1983 | Langen et al. | 134/1 |
| 4,451,437 | 5/1984 | Meyer-Kretschmer et al. | 423/3 |
| 4,534,921 | 8/1985 | Fierkens et al. | 264/39 |
| 4,564,736 | 1/1986 | Jones et al. | 219/121 L |
| 4,587,035 | 5/1986 | Kokta | 252/301.4 F |
| 4,720,621 | 1/1988 | Langen | 219/121.6 |
| 4,838,631 | 6/1989 | Chande et al. | 219/121.77 |
| 4,898,650 | 2/1990 | Wu et al. | 204/29 |
| 4,920,994 | 5/1990 | Nachbar | 134/1 |
| 4,927,226 | 5/1990 | Ortiz, Jr. | 455/611 |
| 4,970,367 | 11/1990 | Miller | 219/121.68 |
| 5,024,968 | 6/1991 | Engelsberg | 437/173 |
| 5,034,592 | 7/1991 | Chun | 219/121.84 |
| 5,068,750 | 11/1991 | Cook et al. | 359/399 |
| 5,072,092 | 12/1991 | Richter et al. | 219/121.72 |
| 5,099,557 | 3/1992 | Engelsberg | 29/25.01 |
| 5,111,023 | 5/1992 | Horibe et al. | 219/121.85 |
| 5,142,120 | 8/1992 | Hanson et al. | 219/121.83 |
| 5,151,134 | 9/1992 | Boquillon et al. | 134/1 |
| 5,151,135 | 9/1992 | Magee et al. | 134/1 |
| 5,204,517 | 4/1993 | Cates et al. | 250/205 |
| 5,272,716 | 12/1993 | Soltz et al. | 219/121.6 |
| 5,531,857 | 7/1996 | Engelsberg et al. | 156/345 |

FOREIGN PATENT DOCUMENTS

| | | | |
|---|---|---|---|
| 0380387 | 1/1990 | European Pat. Off. . | |
| 391113 | 10/1990 | European Pat. Off. | 134/1 |
| 475806 | 3/1992 | European Pat. Off. . | |
| 258753 | 8/1988 | Germany | 134/1 |
| 60-102291 | 6/1985 | Japan | 219/121.68 |
| 1122417 | 5/1989 | Japan . | |
| 2-62224 | 3/1990 | Japan . | |

*Primary Examiner*—Geoffrey S. Evans
*Attorney, Agent, or Firm*—Biebel & French

[57] ABSTRACT

A system for cleaning molds within presses is disclosed wherein the system utilizes a light source including a laser to clean surfaces within the mold. The light source is aligned with an opening in the mold and light from the laser is directed onto the mold surfaces to vaporize residual material thereon to thereby clean the surfaces. The light source may be formed as a portable unit movable between different presses, or the light source may be in the form of a single laser with a plurality of light paths leading from the laser to individual presses such that light may be selectively conveyed along the light paths to clean the molds within the presses.

21 Claims, 2 Drawing Sheets

SYSTEM FOR CLEANING MOLDING EQUIPMENT USING A LASER

Matter enclosed in heavy brackets [ ] appears in the original patent but forms no part of this reissue specification; matter printed in italics indicates the additions made by reissue.

BACKGROUND OF THE INVENTION

The present invention relates to a system for cleaning molding equipment, and more particularly, to a system for increasing the efficiency and reducing the cost of cleaning molding equipment by using a laser.

In a typical molding operation, a mold having interior surfaces configured to correspond to the shape of an article to be molded is mounted in a press and the material to be used to form the article is supplied to the mold and molded to the desired shape. When the article is removed from the mold, a certain amount of residual material remains on the interior mold surfaces. For example, when a molded rubber article is formed, residual material in the form of small pieces of rubber and/or release agents remain within the mold and must be removed through a cleaning process.

Various cleaning processes have been used for cleaning molds and most known cleaning processes incorporate a media which is introduced into the interior of the mold to impart a physical force to any residual material on the interior mold surfaces whereby the material is physically removed from the mold. Early known cleaning processes incorporated glass beads as the cleaning media which would be blown or blasted into the mold to perform a sand blasting type of cleaning operation. Subsequently, plastic beads were introduced as the cleaning media in order to reduce the amount of abrasion and possible damage which may occur to the interior of the mold tooling. More recently, $CO_2$ has been used as the cleaning media in order to further reduce the abrasive effects of the cleaning operation on the tooling.

A problem associated with glass and plastic beads is the tendency of the bead media to become lodged or trapped within the mold which will have a deleterious effect on articles subsequently formed within the mold. Further, crevices in the mold can be difficult for the media to reach, particularly if the surface is located within a crevice which cannot be directly blasted by the media.

In addition, when $CO_2$ is used as the blasting media, the $CO_2$ tends to reduce the temperature of the mold such that the mold must be reheated before it can be put back into use in a molding operation.

It should also be noted that when a cleaning media is used, the mold tooling must typically be removed from the press that it is mounted in and taken to a separate cleaning area for the cleaning operation. This removal of the mold from the press results in a significant down time for the press both because of the time required to remove and reinstall the mold and as a result of the mold cooling off during its removal such that it must be reheated before the molding operation continues.

Finally, the use of a cleaning media results in increased expense for operating the molding apparatus in that there is a continuing expense for the purchase and disposal of the media used for the cleaning.

Accordingly, there is a need for a cleaning system for use with molds wherein down time interfering with the molding operation is minimized while also reducing the operating costs of the cleaning system.

SUMMARY OF THE INVENTION

It is a primary object of the present invention to provide a system and method for on-site cleaning of molds mounted in presses, as well as equipment associated with a molding operation, wherein the cleaning is performed in a non-erosive manner.

In one aspect of the invention a method of cleaning equipment associated with a molding operation is provided comprising the steps of: aligning a light source including a laser with the equipment, and activating the laser to cause light from the light source to impinge on a surface of the equipment to thereby clean residual material from the surface.

In a further aspect of the invention, the laser is preferably a pulsed laser and the light source portable and includes a moveable output end which is adapted to be aligned with the equipment. The output end may be defined as the end of an optical fiber wherein the optical fiber forms a flexible and movable conduit for the light.

The laser may be incorporated into a portable light source which is movable between different presses for cleaning the molds therein. Alternatively, a central laser may be provided and light conduits, such as optical fibers, may be provided leading from the laser to individual presses, and the light conduits may be selectively activated to supply light to the output ends thereof as required to clean the individual molds at the different presses.

As light from the laser is directed onto the molding equipment surfaces, residual material on the surfaces thereof is vaporized and thereby removed from the equipment. In addition, further material is removed from the equipment surfaces as a result of it being blown off of the surfaces as material underneath the blown off material is vaporized.

In a further aspect of the invention, surfaces of the molding equipment are cleaned by both direct light and by light reflected off of interior surfaces of the equipment whereby the various crevices in the equipment are thoroughly cleaned.

Other objects and advantages of the invention will be apparent from the following description, the accompanying drawings and the appended claims.

DETAILED DESCRIPTION OF THE PREFERRED EMBODIMENT

The present invention provides an efficient and cost effective cleaning system incorporating a laser, as well as a convenient system for directing light from the laser onto equipment surfaces to be cleaned including the use of fiber optics. In addition, it should be noted that while the following detailed description of the invention refers to the cleaning of molds, the present invention is equally suited for the cleaning of equipment associated with a molding operation including mills, extruders, finishing equipment and mixers.

Figure 1:
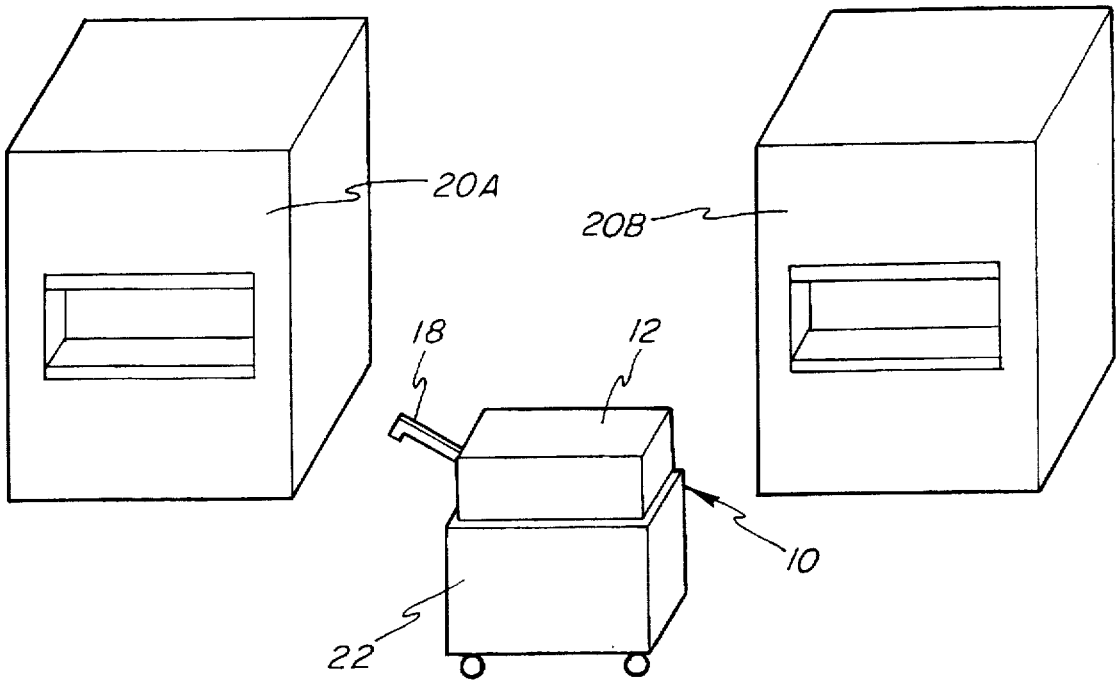
FIG. 1 is a schematic diagram illustrating a portable laser unit for positioning adjacent to different press stations.
Figure 2:
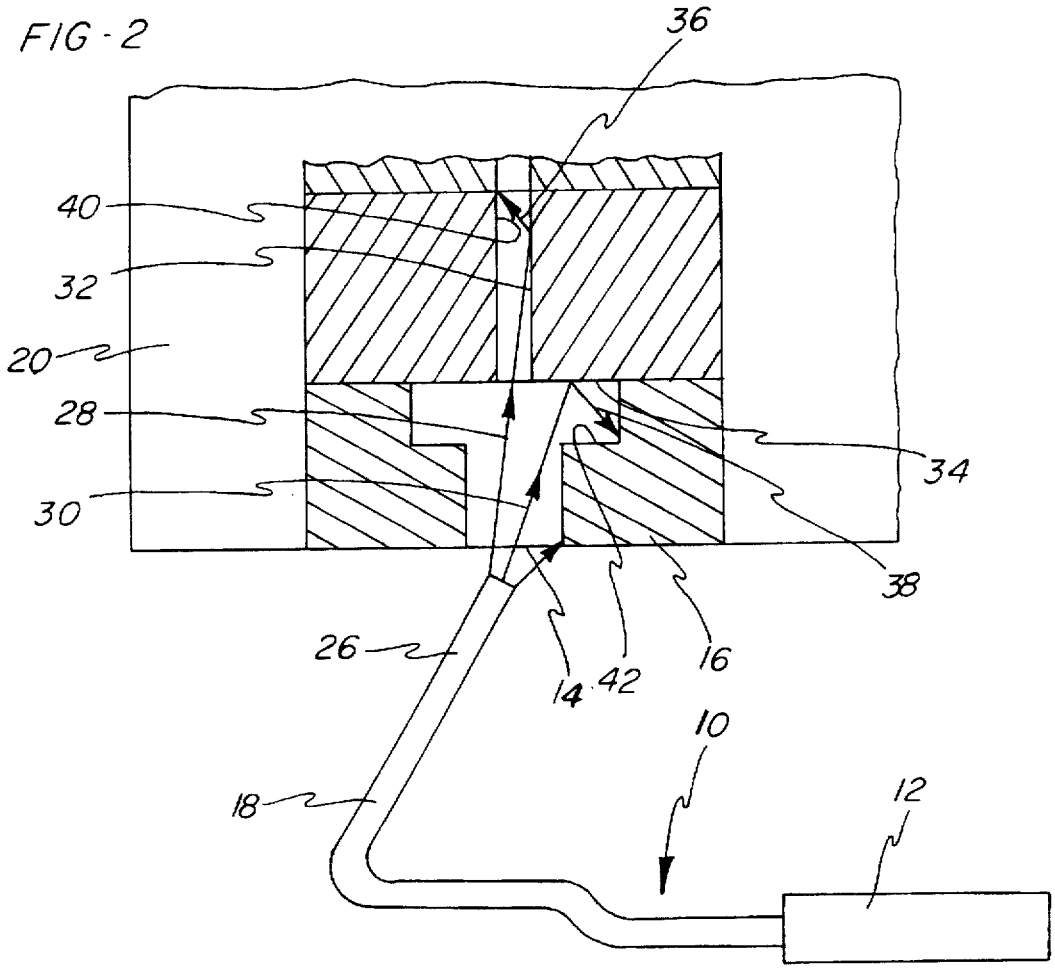
FIG. 2 is a partial cross-sectional view showing a mold within a press and illustrating the path followed from a light pen positioned adjacent to an opening in the mold.

Referring to FIGS. 1 and 2, the system for the present invention comprises a light source 10 including a laser 12 and an optical system 18 for directing light from the laser 12 to an opening 14 in a mold 16. The optical system 18 is illustrated in FIG. 2 as a flexible fiber optic light conduit, but may also be formed by a system of mirrors or other conventional optical devices for directing laser light to a desired target. The laser 12 is preferably a pulsed laser which delivers high energy pulses of light, as opposed to a continuous laser which would provide a continuous light beam output, and such a pulsed laser has a relatively low power requirement and may be operated off a conventional 110 V power supply.

The mold 16 is typically formed as a metal tooling component which is mounted within a press 20A. As seen in FIG. 1, the light source 10 may be formed as a portable unit and may be mounted to a cart 22 for movement to a location adjacent to the press 20A, such that the mold 16 need not be removed from the press 20A prior to the cleaning operation. FIG. 1 also illustrates a second press 20B which is positioned in a location in spaced relation to the first press 20A and which also contains a mold, and the light source 10 may be moved to a location adjacent to the second press 20B for servicing the mold therein. Thus, the light source 10 may be moved to a plurality of press stations to clean the molds in each of the stations without requiring the removal of the molds to thereby increase the efficiency of the mold cleaning operation over the prior art cleaning operations.

FIG. 2 illustrates the light source 10 in use during a typical mold cleaning operation. An output end 26 of the fiber optic element 18, which may be in the form of light pen, is aligned with the opening 14 of the mold 16 to thereby direct light rays onto surfaces within the mold 16. The output end 26 is preferably provided with a configuration which is easily held by an operator such that the operator may hold the output end 26 at various incident angles relative to the mold opening 14 to thereby direct the light from the output end 26 onto the different surfaces within the mold 16.

As seen in FIG. 2, certain rays impinge directly upon the surfaces within the mold, as is illustrated by rays 28 and 30 impinging upon the surfaces 32 and 34, respectively. Other rays clean the mold surfaces in an indirect manner, as is illustrated by reflected rays 36 and 38 impinging upon surfaces 40 and 42, respectively, whereby a thorough cleaning of the mold 16 is provided. In addition, the light exiting the output end 26 may be directed in a diverging pattern such that the intensity of the light at locations which are not immediately adjacent to the output end 26 will be greatly diminished to minimize the possibility of operator injury if the output end 26 is misdirected.

Residual material left in the mold 16 from a molding operation may include material used to form the molded article, release agents or other residual material. As the light from the output end 26 impinges on the mold surfaces, the residual material will be vaporized and thereby released from the mold surfaces. In addition, less volatile residual material will be blown off the mold surfaces as a result of the more volatile substances vaporizing underneath the less volatile materials. For example, when a rubber or elastomeric article is molded within the mold 16, residual release agent and pieces of rubber will remain in the mold and laser light exiting from the output end 26 will cause the release agent to vaporize and the expansion of the release agent during vaporization will cause the rubber to blow off of the mold surfaces. It should be noted that an air supply (not shown) may be provided at the output end 26 to blow air into the mold opening 14 during the cleaning operation whereby complete purging of the material from the mold is assured.

Figure 3:
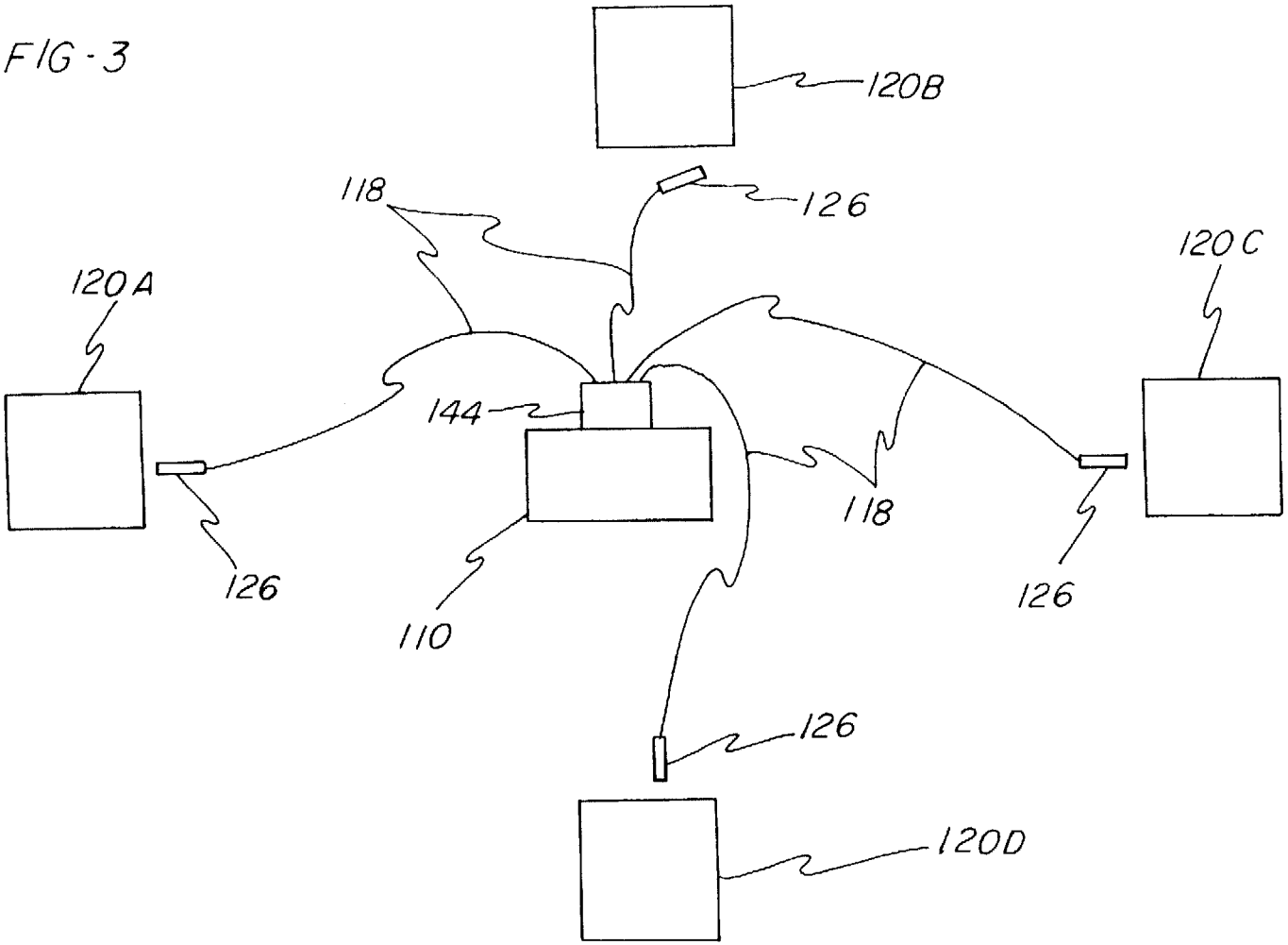
FIG. 3 is a schematic diagram illustrating the present invention wherein a single laser is used to service a plurality of presses in a cleaning operation.

Referring to FIG. 3, an alternative embodiment of the present invention is illustrated diagrammatically wherein a single central laser light source 110 is provided for servicing a plurality of press stations 120A–D. Multiple light paths from the laser light source 110 to the plurality of press stations 120A–D is defined by a plurality of optical fibers 118 which terminate in individual light pens 126 located at each station. The light pens 126 may be actuated by operators at each of the stations 120A–D for a cleaning operation on molds within the stations 120A–D. In addition, control of light passing from the light source 110 to each of the light paths 118 may be provided through a coupler 144 which directs light down the appropriate path 118 as it is needed for a cleaning operation, and the coupler 144 may be operated under control of a central computer (not shown) for monitoring operations at each of the stations 120A–D.

It should also be noted that the light paths 118 may be defined by optical delivery systems other than the optical fiber system shown such as by mirrors or other conventional means to direct light to the individual stations 120A–D.

From the above description, it should be apparent that the present mold cleaning system may be used immediately after an article is formed in and removed from the mold 16, and that the cleaning operation may be performed without removing the mold 16 from the press 20 such that a highly efficient cleaning method is provided which substantially avoids the cooling of the mold associated with prior art cleaning methods. In addition, it should be apparent that the present cleaning method is adapted for cleaning various pieces of equipment associated with a molding operation, and that the present method does not require the introduction of a cleaning media into the equipment and therefore avoids contamination of the equipment with a media.

It should also be apparent that by using a laser light source, various molding equipment surfaces, including crevices, will be effectively cleaned by either direct or reflected light such that a more thorough cleaning of the equipment is assured, and the cleaning is performed in a non-erosive manner to extend the life of the mold tooling and associated molding equipment.

While the method herein described, and the form of apparatus for carrying this method into effect, constitutes a preferred embodiment of this invention, it is to be understood that the invention is not limited to this precise method and form of apparatus, and that changes may be made in either without departing from the scope of the invention, which is defined in the appended claims.

What is claimed is:

[1. A method of cleaning equipment associated with a molding operation comprising the steps of:

aligning a light source including a laser with said equipment; and activating said laser to cause light from said light source to impinge on a surface of said equipment to thereby clean residual material from said surface.]

[2. The method as in claim 1 wherein said laser is a pulsed laser.]

[3. The method as in claim 1 wherein said light source is portable, and including the step of moving said light source from alignment with a first surface of said equipment located at a first station into alignment with a second surface of said equipment located at a second station.]

[4. The method as in claim 1 wherein said light source comprises a single laser and a plurality light paths for conveying light from said laser to a plurality of distinct molding stations, and including the step of selectively activating said light paths to selectively clean equipment associated with each of said stations.]

[5. The method as in claim 1 wherein said light source includes an optical fiber defining a movable output end for alignment with said surface, said optical fiber defining a flexible and movable conduit for said light and said step of aligning said light source comprises an operator holding said output end adjacent to said surface.]

[6. The method as in claim 5 wherein a plurality of optical fibers having output ends are provided defining a plurality of light sources for cleaning equipment at a plurality of separate stations, and including the step of conveying light from a single laser to each of said stations.]

[7. The method as in claim 6 including the step of selectively activating one of said optical fibers to clean equipment at a first station, and subsequently deactivating said one optical fiber and activating another optical fiber to clean equipment at a second station.]

[8. The method as in claim 1 including the step of cleaning additional equipment surfaces by reflecting said light off of said surface and onto said additional surfaces.]

[9. The method as in claim 1 wherein said step of activating said laser causes said residual material to be vaporized.]

[10. The method as in claim 9 wherein said step of activating said laser further causes said residual material to be blown off of said surface as material underneath the material to be blown off is vaporized.]

[11. A method of cleaning a surface comprising the steps of:

providing a light source including an optical fiber and a laser;

aligning an output end of said optical fiber with said surface; and activating said laser to cause light to pass through said optical fiber to said output end and impinge on said surface to thereby clean residual material from said surface.]

[12. The method as in claim 11 wherein said laser is a pulsed laser.]

[13. The method as in claim 11 wherein said optical fiber defines a flexible and movable conduit for said light and said step of aligning said output end comprises an operator holding said output end adjacent to said surface.]

[14. The method as in claim 11 wherein a plurality of optical fibers having output ends are provided defining a plurality of light sources for cleaning surfaces at a plurality of separate stations, and including the step of conveying light from a single laser to each of said stations.]

[15. The method as in claim 14 including the step of selectively activating one of said optical fibers to clean a surface at a first station, and subsequently deactivating said one optical fiber and activating another optical fiber to clean a surface at a second station.]

[16. The method as in claim 11 wherein said cleaning is performed on a surface located on equipment associated with a molding operation.]

[17. A method of cleaning equipment associated with a molding operation comprising the steps of:

providing a light source including a plurality of optical fibers and a single pulsed laser, each said optical fiber having an output end located at a molding station;

aligning an output end of a first optical fiber with a first surface in a first molding station;

activating said first optical fiber to thereby clean residual material from said first surface;

aligning an output end of a second optical fiber with a second surface in a second molding station;

deactivating said first optical fiber and activating said second optical fiber to clean said second surface; and wherein said steps of aligning said output ends of said first and second optical fibers comprises an operator holding said output ends adjacent to said first and second surfaces, respectively.]

[18. A cleaning system for use in combination with equipment associated with a molding operation, said system comprising:

a light source including a laser;

means for aligning said light source with said equipment; and wherein activation of said laser with said light source aligned with said equipment causes residual material attached to surfaces of said equipment to be removed.]

[19. The system as in claim 18 wherein said laser is a pulsed laser.]

[20. The system as in claim 18 wherein said means for aligning comprises a light pen having an end adapted to be positioned adjacent to said surfaces of said equipment, said light pen being connected to said laser through a fiber optic connection.]

[21. The system as in claim 18 wherein said light source is formed as a portable unit for movement to locations adjacent to a plurality of molds located at different molding stations.]

[22. A cleaning system comprising:

a light source including an optical fiber and a laser;

said optical fiber defining a flexible and movable conduit for conveying light from said laser and including an output end for alignment with a surface to be cleaned; and wherein activation of said laser with said output end positioned in alignment with said surface causes residual material attached to said surface to be removed.]

[23. The system as in claim 22 wherein said laser is a pulsed laser.]

[24. The systems in claim 22 including a plurality of optical fibers having output ends located at a plurality of separate stations wherein light is conveyed from said laser through said optical fibers to perform a cleaning operation at each of said stations.]

[25. The system as in claim 22 including molding equipment, said surface being located on said molding equipment and said output end being located adjacent to said surface.]

[26. A cleaning system for use in combination with equipment associated with a molding operation, said system comprising:

a light source comprising a plurality of optical fibers and a pulsed laser;

said optical fibers defining flexible and movable conduits for light from said laser, each said optical fiber including an output end located at a respective molding station for alignment with a surface on said equipment to be cleaned; and wherein activation of said laser with said output ends aligned with said surfaces causes residual material attached to said surfaces to be removed.]

*27. In a process for molding rubber articles in a mold mounted within a press in which rubber material is supplied to the mold and residual material remains in the mold after the rubber article is removed therefrom, an improved method for removing said residual material comprising:*

*aligning with an opening in said mold a light source, said light source including a laser; and*

*activating said laser to cause light rays to impinge on an interior surface located inside said mold, said light rays removing said residual material from said interior surface located inside said mold.*

*28. The method of claim 27 wherein said mold contains crevices.*

*29. The method of claim 27 wherein said light rays vaporize at least a portion of said residual material.*

*30. The method of claim 27 wherein said residual material is in the form of small rubber pieces.*

*31. The method of claim 27 wherein said residual material comprises release agents.*

*32. The method of claim 27 wherein said mold remains in said press during removal of residual material therefrom.*

*33. The method of claim 27 wherein said residual material is removed from said mold while avoiding substantial cooling thereof.*

*34. The method as in claim 27 including the step of removing said residual material by means of light rays reflected off said interior surface of said mold and onto additional surfaces of said mold.*

*35. The method as in claim 27 wherein said light source is portable, and including the step of moving said light source from alignment with said opening in said mold.*

*36. The method as in claim 27 wherein said light source comprises a single laser and a plurality of light paths for conveying light rays from said laser to a plurality of said molds, and including the step of selectively activating said light paths to selectively remove said residual material from interior surfaces located inside said molds.*

*37. The method as in claim 27 wherein a plurality of optical fibers having output ends are provided defining a plurality of light sources for removing said residual material from interior surfaces located inside a plurality of said molds, and including the step of conveying light rays from a single laser to each of said molds.*

*38. In a process for molding rubber articles in a plurality of molds, each said mold mounted within a press and supplied with rubber material in which residual material remains in each said mold after the rubber article is removed therefrom, an improved method for removing said residual material comprising:*

*providing a light source including a plurality of optical fibers and a single laser, each said optical fiber having an output end located at one of said molds;*

*aligning an output end of a first optical fiber with an opening in a first mold;*

*activating said first optical fiber to cause light rays to impinge on an interior surface located inside said first mold, thereby cleaning said residual material from said interior surface located inside said first mold;*

*aligning an output end of a second optical fiber with an opening in a second mold; activating said second optical fiber to cause light rays to impinge on an interior surface located inside said second mold, said light rays removing said residual material from said interior surface located inside said second mold.*

*39. The method of claim 38 wherein said light rays vaporize at least a portion of said residual material.*

*40. A cleaning system for use in combination with a mold mounted within a press in which rubber material is supplied to the mold for molding rubber articles and residual material remains in the mold after the rubber article is removed therefrom, said system comprising:*

*a light source including a laser;*

*means for aligning said light source with an opening in said mold; and*

*wherein activation of said laser with said light source aligned with said opening in said mold causes light rays to impinge on an interior surface located inside said mold, said light rays removing said residual material attached to said interior surface located inside said mold.*

*41. The system as in claim 40 wherein said mold contains crevices.*

*42. The system as in claim 40 wherein said means for aligning comprises a light pen having an end adapted to be positioned with said opening in said mold, said light pen being connected to said laser through a fiber optic connection.*

*43. The system as in claim 40 wherein said residual material is in the form of small rubber pieces.*

*44. The system as in claim 40 wherein said residual material comprises release agents.*

*45. The system as in claim 40 wherein said light rays vaporize at least a portion of said residual material.*

*46. A cleaning system for use in combination with a plurality of molds, each said mold mounted within a press and supplied with rubber material for molding a rubber article in which residual material remains in each said mold after said rubber article is removed therefrom, said system comprising:*

*a light source comprising a plurality of optical fibers and a laser;*

*said optical fibers defining flexible and movable conduits for light rays from said laser, each said optical fiber including an output end located at a respective one of said molds for alignment with an opening in said respective one mold; and*

*wherein activation of said laser with said output ends aligned with said openings in said molds causes light rays to impinge on interior surfaces located inside said molds, said light rays removing said residual material attached to said interior surfaces located inside said molds.*

*47. The system as in claim 46 wherein said light rays vaporize at least a portion of said residual material.*

* * * * *